June 12, 1951 W. W. HANSEN 2,556,181

HIGH-FREQUENCY ELECTRON DISCHARGE DEVICE

Filed Dec. 28, 1946

INVENTOR
WILLIAM W. HANSEN
BY
Paul B. Hunter
ATTORNEY

Patented June 12, 1951 2,556,181

UNITED STATES PATENT OFFICE 2,556,181

HIGH-FREQUENCY ELECTRON DISCHARGE DEVICE

William W. Hansen, Stanford University, Calif., assignor to The Sperry Corporation, a corporation of Delaware Application December 28, 1946, Serial No. 719,099

9 Claims. (Cl. 250—27.5)

This invention relates in general to the production of ultra-high-frequency energy through the use of magnetron-type tubes, and in particular, is concerned with improvements in the operation of magnetrons using resonant cavity chambers.

In the usual cavity-resonator magnetrons whose ultra-high-frequency output is produced in pulses, the oscillations of one pulse bear no definite relationship with the oscillations of successive power pulses. That is, during any power pulse, the phase of the oscillations is indeterminately different from that of the oscillations of a different pulse. The control of the phase of the oscillations is highly desirable in many microwave sources. Such sources are usually called "coherent" oscillation sources, as distinguishable from otherwise "incoherent" pulsed oscillators.

Another difficulty experienced in the use of magnetron oscillators which are pulsed is in the length of time it takes for the oscillations of any pulse to reach full amplitude. In fact, if the pulse is of sufficiently short duration and the build-up time is of sufficient length, it is possible that the oscillations of a single pulse never reach their full strength or intensity, and the device fails to oscillate as desired.

A still further difficulty experienced with the use of a magnetron as a pulsed oscillator is termed "mode-hopping". This is the expression used to describe the difficulty that occurs when the cavity resonators, which are the frequency determining elements in the magnetron, suddenly change their mode of oscillation. The frequency of oscillation is, to a great degree, determined by the physical dimensions of the cavity resonators making up the magnetron. However, a small shift in frequency is noted as the mode of oscillation is changed. In most applications this is highly undesirable, and preventative measures are usually taken to prevent the occurrence of such mode-hopping between pulses.

It is, therefore, an object of the present invention to provide an improved magnetron oscillator having a pulsed output, the phase of the oscillations in each successive pulse being controlled.

It is a further object of the present invention to provide excitation means for a pulsed cavity resonator magnetron oscillator for causing the oscillations of each pulse to build up more readily and reliably in the resonators.

It is another object of the present invention to provide excitation means for a cavity resonator magnetron oscillator whose output energy consists of recurrent pulses, such means prohibiting the resonator from changing its mode of oscillation between pulses and thereby maintaining the output frequency constant.

It is a still further object of the present invention to provide a convenient means for the introduction of energy into the magnetron from the excitation means described in the above objects.

The invention in another of its aspects relates to novel features of the instrumentalities described herein for achieving the principal objects of the invention and to novel principles employed in those instrumentalities, whether or not these features and principles are used for the said principal objects or in the said field.

A further object of the invention is to provide improved apparatus and instrumentalities embodying novel features and principles, adapted for use in realizing the above objects and also adapted for use in other fields.

In order to achieve the above objects, the resonators of the magnetron are, in accordance with the present invention, made to oscillate continuously at a low level by the introduction of a small amount of high-frequency energy from an auxiliary oscillator, thus providing a predetermined minimum energy level for the resonator oscillations. The high-frequency energy, which assures the maintenance of a low-level field, may easily be fed into a magnetron of the cold-cathode type by the teachings of the present invention. As is well known, such a cathode operates upon the principle of secondary emission, and requires a primary source of electrons. This primary source of electrons is supplied by a so-called "starting" filament. In general, such a filament is heated sufficiently to cause it to emit electrons. The filament is usually positioned close to the cathode, or secondary emitting surface, so that some of the emitted electrons strike the cathode, causing the secondary emission. Thereafter the starting filament may, in some cases, be de-energized.

The high-frequency control energy, which it is desired to feed into the magnetron, may be introduced by means of this starting filament, which is used as one of the input electrodes and the shell in which is formed the cavity resonators as the other, whereby the low-level field is thus created within the space surrounding the filament and cathode, and in the cavity resonators themselves. The presence of the low-level field is sufficient to velocity modulate the electron cloud so that, when the magnetron is pulsed, that is, when a high potential is applied momentarily between the cathode and the cavity resonator shell the resulting oscillations will occur most easily at the frequency of the low-level field. As this frequency is adjusted or selected to be the same as the resonant frequency of the cavity resonators operating in a particular desired mode, it is readily seen that there is a strong inclination for the magnetron resonators to oscillate in this mode and little likelihood of oscillations occurring in an undesired mode. Since the low-level field exists prior to the pulse, there is no danger of the magnetron changing its mode of oscillation between pulses.

Furthermore, not only is the frequency of the high-level high-frequency energy controlled or suggested by the low-level field, but the phase of the resulting high-level oscillations is also controlled. This is true since the magnetron, when pulsed, merely causes, in affect, the amplitude of the already existing low-level field to be greatly increased. Actually, the magnetron itself acts as an oscillator, separate and apart from the auxiliary oscillator, but because of the frequency and phase "lock-in" effect, it may from one viewpoint, be considered as an ultra-high-frequency amplifier.

Since the energy fed into the magnetron creates a field having a predetermined minimum energy level, it is easily seen that the oscillations, which occur when the magnetron is pulsed reach full amplitude in a much shorter time than if the low-level field were nonexistent. Because of this decrease in build-up time, it is possible to have high-level ultra-high-frequency oscillations produced and sustained in the resonator with pulses of very short duration.

The achievement of these and other objects by the present invention will become more apparent from the following description, taken in connection with the accompanying drawing wherein.

Figures 1, 2:
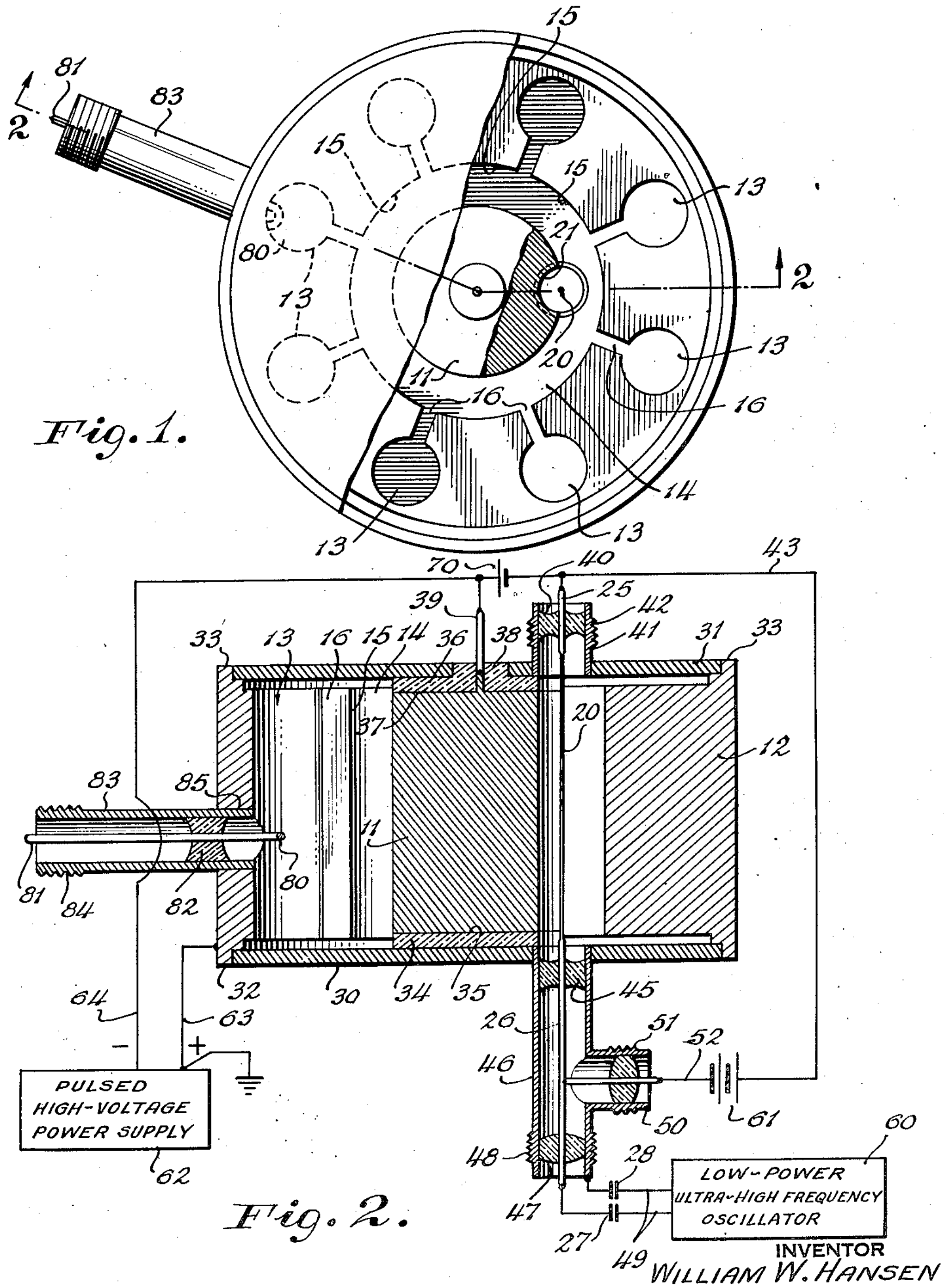
Fig. 1 is a top view of the magnetron tube with parts removed and cut away.
Fig. 2 is a section view of Fig. 1 taken along line 2—2 thereof.

Referring now more particularly to Fig. 1 which is a top view of a cavity resonator type magnetron having a cylindrical-shaped cathode 11 placed in the center of a thick-walled, cylindrical-shaped resonator block or anode member 12 which has an even number of radially disposed cylindrical cavity resonators 13 formed in the conducting walls of the resonator block 12, the axes of the resonators 13 being parallel to the axis of the resonator block 12. Each cylindrical resonator cavity 13 is connected to a common cylindrical interspace 14 between the inner wall 15 of the anode block 12 and the surface of cathode 11, by a narrow radial slot 16 which extends the length of resonator 13.

Cylindrical cathode 11 is of the secondary emission type having its surface coated with a material which emits an abundance of electrons when it is bombarded with a small number of electrons from a primary source. A filament 20, supported longitudinally along the axis of a semi-cylindrical depression 21 in cathode 11, supplies the primary electrons when it is heated to emitting temperature. The axis of the cylindrical depression 21, along which filament 20 lies, is parallel to the axis of cathode 11 and is spaced from it by a distance substantially equal to the radius of cylindrical cathode 11.

Fig. 2, which is a sectional view of Fig. 1 taken along line 2—2, shows how cathode 11 and filament 20 are supported. Auxiliary equipment is diagrammatically shown in this view to further aid in explaining the present invention. As can be seen, anode member 12 has its ends closed by a pair of end plates 30 and 31 which nest into rims or flanges 32 and 33 formed at each end of the cylindrical resonator block or anode member 12. The seal between the end plates 30 and 31 and the anode member 12 at the rims 32 and 33 is made airtight to permit later evacuation of the magnetron tube. Cathode 11 is mechanically supported along the axis of anode member 12 by the end plates 30 and 31. A disc of insulating material 34 separates the lower end 35 of cathode 11 from the bottom plate 30. A similar insulating disc 36 separates the upper plate 31 from the upper end 37 of cathode 11. A cathode lead-in 39 passes through an insulating bushing 38 and insulating disc 36 to cathode 11 without short-circuiting to upper end plate 31. Since the cathode 11 is insulatedly supported within the resonator anode member 12, a potential difference may be applied between these two elements, lead-in 39 serving as the conducting terminal for cathode 11, and inner wall 15 of anode member 12 serving as the anode face surface.

The upper end of filament 20 is connected to lead-in member 25 which is mechanically supported by a glass airtight seal 40 within a short section of conducting tubing 41 which is inserted into the upper end plate 31. The externally protruding end of tubing section 41 and the extended end of lead-in member 25 form a short section of coaxial line. External threads 42 may be provided on the outer wall of section 41 near its extreme end to permit mechanical coupling to a lead wire which is diagrammatically shown as 43.

The lower end of filament 20 is connected to lead-in member 26 which is mechanically supported in a similar fashion by a glass airtight seal 45 within a section of conducting tubing 46 inserted into the lower end plate 30. As before, tubing section 46 and extended lead-in member 26 form a short section of coaxial line.

Tubing section 46 is deliberately made longer than section 41 and has a second glass seal 47 at its extreme end to provide greater mechanical rigidity for lead-in member 26. External threads 48 may be provided on the outer wall of tubing section 46 near its end to permit mechanically coupling to a coaxial line which is shown diagrammatically as 49.

A coaxial T-section 50 is provided in the section of coaxial line formed by tubing section 46 and lead-in member 26. This T-section 50 is provided with threads 51 near its end to permit the connecting of second lead wire 52 to filament 20 through lead-in 26.

Coaxial line 49 connects an ultra- or super-high-frequency oscillator 60 to the coaxial line section formed by tubing section 46 and lead-in member 26. Condensers 27 and 28 are inserted in both legs of coaxial line 49 to permit the alternating frequency output of oscillator 60 to pass unhindered while preventing any direct current from passing along the line 49. Lead wire 52 connects one terminal of a battery 61 to one end of filament 20 and connecting lead wire 43 connects the other terminal of battery 61 to the opposite end of filament 20.

A high voltage power supply 62 has its positive terminal connected by a lead wire 63 to the resonator block 12. For reasons of operating safety, this lead wire 63 is usually earthed so that the resonator block 12 operates at ground potential. The negative terminal of the high voltage power supply 62 is connected by a lead wire 64 to the cathode lead-in terminal 39. Since terminal 39 is insulated from the resonator block 12 by insulating bushing 38, the output voltage of the power supply 62 is applied between the conducting resonator block 12 and the cathode 11.

The oscillations generated in the magnetron may be led from the tube by means of a coupling loop 80 located in one of the resonators 13. One end of the loop 80 is fastened to the wall of resonator 13 and the other end passes through an aperture 85 in resonator shell 12 and is connected to a lead wire 81 which passes through a glass seal 82 to form the center conductor of a coaxial output connection, with the outer conductor being formed of a tubular member 83 sealed to the outer wall of anode member 12. Threads 84 may be provided on the outer wall of tubular member 84 for easy and efficient connection to a coaxial coupling line, not shown, through which the high frequency oscillations generated by the magnetron may be conducted to a suitable utilization circuit.

In the operation of such a cavity resonator magnetron, a magnetic field is supplied which is directed along the axis of the tube. For simplicity, the source of such a magnetic field is omitted from the accompanying drawings. It may be an electromagnet with the tube placed between the pole pieces, or a simple permanent magnet may be used to supply the magnetic field along the tube's axis.

Filament 20 is heated to an emission temperature by passing an electric current therethrough, the necessary potential being supplied by battery 61 connected to filament 20 by means of leads 52 and 43. Some of the electrons emitted by filament 20 are attracted to the cathode 11 by a battery 70 connected therebetween. Since the surface of cathode 11 is coated with a material which emits an abundance of electrons upon bombardment, a large number of secondary emitted electrons are produced.

If a potential is applied between cathode 11 and the anode member 12 by the high voltage power supply 62 with the anode member 12 being connected to the positive lead 63, the resulting electric field will cause the secondary electrons emitted from cathode 11 to travel substantially in a radial direction away from cathode 11. However, these outwardly moving electrons will also be affected by the axially directed magnetic field which causes them to move at right angles to the radial direction. The resulting path of the electrons will thus be influenced by the combined effect of the electric and magnetic field. As a result, the electrons will be whirled in the interspace 14 past the slots 16 which connect inner space 14 with the cylindrical resonant chambers 13. By the proper adjustment of the electric and magnetic fields of the magnetron, it is possible to maintain this whirling cloud of electrons in the interspace 14 with cathode 11 supplying new electrons to the cloud to replace those which strike the anode face surface 15.

The whirling cloud of electrons gives up some of its energy as it passes by slots 16 and initiates or reenforces electromagnetic oscillations within the cylindrical resonators 13. This is possible since the standing waves established within the resonators 13 by the electromagnetic oscillations created therein causes the instantaneous polarity of adjacent anode face surfaces 15 to be opposite. If the whirling cloud of electrons passes by slot 16 at the instant that the polarity of a pair of adjacent anode face surfaces tends to oppose its motion, some of the energy of the whirling cloud is given up to this opposing field. This energy reenforces the electromagnetic oscillations within the resonator 13 and oscillations are thereby maintained in the system.

If the potential that is supplied by high voltage power supply 62 is maintained constant, the oscillations which are set up in cylindrical resonators 13 will be sustained and electromagnetic energy may be removed from the resonator 13 by means of a conventional coupling loop 80 located in one of the resonators 13. The output of the magnetron in such a case will be of the continuous wave type; that is, it will be a continuous train of oscillations whose amplitude will remain constant and whose frequency will be determined by the physical dimensions of cylindrical resonators 13 and the mode in which they are oscillating. However, in many applications it is desirable to produce pulses of oscillations rather than a continuous train. This is accomplished by pulsing the high voltage power supply 62. If this is done, oscillations will be set up in the resonators 13 only during those intervals when power supply 62 supplies potential between cathode 11 and resonator shell 12. Several problems arise in such a case, as has been discussed above. First, the oscillations of any one pulse bear no definite relationship with the oscillations of successive power pulses. Since in many microwave systems it is desirable to control the phase of oscillations in successive power pulses, some method of synchronizing or adjusting the phase of oscillations in each succeeding pulse is required. Furthermore, if the magnetron oscillator is pulsed, it takes a finite time for the oscillations generated in the resonators 13 to reach full amplitude. If the pulses are of extremely short duration and the build-up time of oscillations is relatively lengthy, it is possible to reach a condition where the oscillations of any single pulse never reach their full amplitude and the device fails to operate as desired.

Another difficulty when power supply 62 is pulsed is that the cavity resonators 13 will occasionally change their mode of oscillation between pulses. Since the frequency output is a function of the mode of oscillation as well as the physical dimensions of the resonators 13, this causes the output frequency of the magnetron tube to shift, which is highly undesirable.

To overcome these difficulties, low-power oscillator 60 is connected to filament 20 and anode member 12 through coaxial line 49. The outer conductor of coaxial line 49 is electrically connected to anode member 12 through tubing 46 and end plate 30. The center conductor of coaxial line 49 is connected to filament 20 through lead-in member 26. The ultra high frequency energy output of oscillator 60 thereby sets up an electric field in interspace 14 between filament 20 and anode face surfaces 15. The frequency of oscillator 60 is adjusted to be that of the resonant frequency of resonators 13 when they are oscillating in their preferred or desired mode. The presence of this high frequency low-intensity field in interspace 14 aids in overcoming the difficulties encountered in pulsing the magnetron.

When power supply 62 is pulsed, the electrons which travel toward resonator shell 12 under the influence of the field between cathode 11 and anode member 12 are already influenced by the pre-existing low-level field supplied by low-power oscillator 60 and thus have a preferred frequency of oscillation with a definite phase relationship to the oscillations of the preceding pulse. As a result, the oscillations which are generated in resonators 13 are merely amplified versions of the field oscillations in interspace 14. The frequency and phase of these oscillations are identical with the frequency and phase of the output of oscillator 60. Because of this controlling or lock-in effect exhibited by the low-level field existing in interspace 14, there is little danger of mode-hopping occurring between successive pulses of power supply 62. Furthermore, the phase of oscillations in the recurring pulses are completely controlled by the output of oscillator 60. Also, it is easily seen that the build-up time is reduced by this system, since a pre-existing minimum level of alternating field is already existing in the magnetron interspace region 14 prior to the pulsing of power supply 62. For that reason, the oscillations of the output pulses need not be built up from zero but merely from this pre-existing low-level field.

The present invention provides a most convenient method for introducing this controlling energy into the magnetron and for setting up the low-level field in the interspace region 14. The presence of the filament 20 is required in the operation of the secondary emission type cathode and in general is electrically insulated from it. Battery 61 may sometimes be disconnected after the tube has begun operation, since some electrons fall back on cathode 11 and generate further secondary electrons to continue operation.

Thus, without the introduction of new elements or members, but merely by utilizing an already present and necessary element in the tube, it is possible to greatly increase the frequency stability of the magnetron. Furthermore, if the tube is to be pulsed, it is possible to control the phase of the oscillations in the pulses, minimize build-up time and eliminate the danger of mode-hopping.

The filament in this description is shown to be of a rod-type supported in a semi-cylindrical depression in the cylindrical cathode surface. The coaxial line method of feeding the controlling energy as described is thought to be extremely convenient and easy to manipulate. The lead from the low-powered local oscillator may be connected to and disconnected from the magnetron without interfering with any of the other connections to the magnetron and without disturbing the system. However, it is not intended to limit the scope of the present invention to the described filament-cathode disposition, but it is intended to embrace other constructions which utilize a filament as the source of primary electrons and a cathode as a source of secondary omitted electrons, the filament and cathode having no direct electrical connection with each other.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An electron discharge device comprising a cylindrical cathode having a semi-cylindrical depression in its surface, said cathode being of the secondary emitting type, a filament member supported along the axis of said semi-cylindrical depression, means defining a plurality of cylindrically arranged anode faces surrounding said cathode and mutually separated by a plurality of longitudinal slots, means defining a like plurality of cylindrical cavity resonators each having a longitudinal slot in its wall, said last slots communicating with said first-named slots, a source of electromagnetic oscillations, and means connecting said source between said filament and said anode.

2. An electron discharge device comprising a cylindrical cathode of the secondary emitting type, a substantially cylindrical anode member surrounding said cathode, said anode member having a plurality of apertures and defining also a like plurality of cavity resonators communicating with said apertures, a filament positioned intermediate said cathode and said anode member, a source of electromagnetic oscillations, and means connecting said source between said filament and said anode member.

3. An electron discharge device comprising a cathode, means defining a plurality of anode faces surrounding said cathode and separated by a like plurality of slots, means defining a like plurality of cavity resonators each having an aperture in the resonator wall, said resinator wall apertures communicating with said slots, a filament positioned intermediate of said cathode and said anode faces, a source of electromagnetic oscillations, and means connecting the output terminals of said source between said filament and said anode faces.

4. An electron discharge device comprising a cylindrical cathode of the secondary emitting type, a substantially cylindrical anode member surrounding said cathode, said anode member having a plurality of apertures and defining also a like plurality of cavity resonators communicating with said apertures, a filament positioned intermediate said cathode and said anode member, means connected to said anode member and said filament producing an alternating electromagnetic field between said anode member and said filament, means adjacent said anode member producing a magnetic field parallel to axis of said cylindrical cathode, and means connected to said cathode and said anode member for producing a pulsating electric field between said cathode and said anode member, whereby high frequency electromagnetic oscillations are generated in said cavity resonators in phase with said alternating electromagnetic field.

5. An electron discharge device comprising a cylindrical cathode, means defining a plurality of cylindrically arranged anode faces surrounding said cathode and mutually separated by a plurality of longitudinal slots, means defining a plurality of cylindrical cavity resonators each having a longitudinal aperture in its wall, said last apertures connecting with said first-named slots, an electrode positioned intermediate said cathode and said anode faces, means connected between said electrode and said anode face for producing an alternating electromagnetic field between said electrode and said anode face, means adjacent said anode face means for producing a magnetic field substantially parallel to axis of said cylindrical cathode, means connected between said cathode and said anode faces for producing an electric field between said cathode and said anode faces, and means connected to said electric field producing means for pulsing said electric field, whereby said alternating field between said anode faces and said electrode controls the phase and frequency of electromagnetic oscillations generated in said cavity resonators.

6. An electron discharge device comprising a source of electrons, means defining a plurality of anode faces surrounding said source and separated by a like plurality of slots, means defining a like plurality of cavity resonators each having an aperture in its resonator wall, said resonator wall apertures communicating with said slots, an electrode positioned intermediate said source and said anode faces, and means connected to said electrode and said anode face means for producing an alternating electromagnetic field extending between said anode face and said electrode.

7. An electron discharge device comprising a cathode, an anode member surrounding said cathode and defining a plurality of resonant circuits, an electrode positioned intermediate said cathode and said anode member, and means connected to said electrode and said anode member supplying an alternating electromagnetic field extending in the interspace between said anode and said electrode.

8. A system for an electron discharge device, comprising a cathode, an anode member surrounding said cathode and defining an interspace therebetween, an electrode positioned in said interspace, a plurality of cavity resonators defined within said anode member, each of said cavity resonators communicating with said interspace through an aperture in said resonator wall, and means external said anode member for supplying an alternating electromagnetic field extending between said anode member and said electrode in said interspace.

9. An electron discharge device, comprising a first source of electrons, a secondary source of electrons adjacent said first electron source, an anode member having a plurality of face surfaces surrounding said first and secondary electron sources and defining a plurality of cavity resonators, a first and second lead-in member each comprising a section of conductive tubing and an extended portion of said first electron source, a third lead-in member coupled to one of said first and second lead-in members, and means in each lead-in member providing hermetical seals.

WILLIAM W. HANSEN.

REFERENCES CITED

The following references are of record in the file of this patent:

UNITED STATES PATENTS

| Number | Name | Date |
|---|---|---|
| 2,114,114 | Roberts | Apr. 12, 1938 |
| 2,163,157 | Samuel | June 20, 1939 |
| 2,409,038 | Hansell | Oct. 8, 1946 |
| 2,438,194 | Steele, Jr., et al. | Mar. 23, 1948 |
| 2,450,763 | McNall | Oct. 5, 1948 |